Sept. 14, 1937.　　　W. H. MULLINS　　　2,093,053
VENTILATING WINDOW FOR VEHICLES
Filed March 21, 1934　　　3 Sheets-Sheet 2
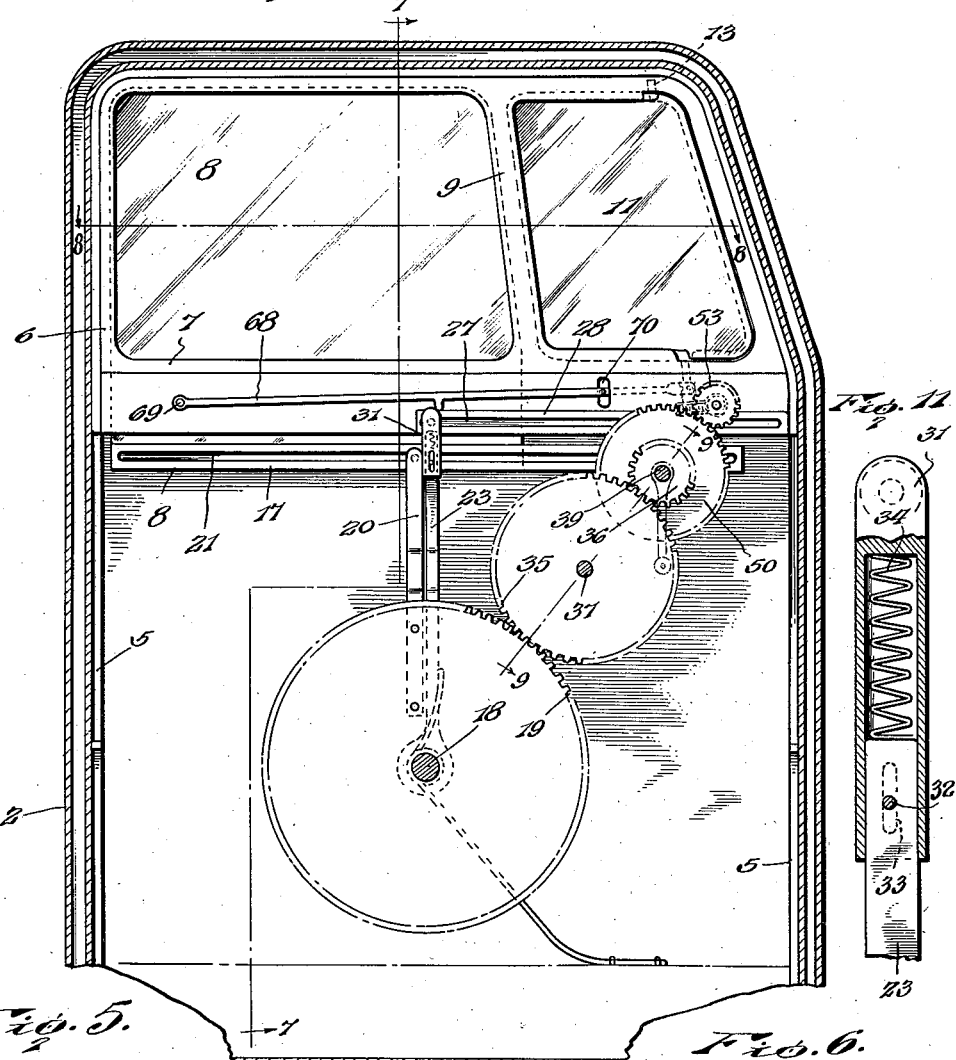
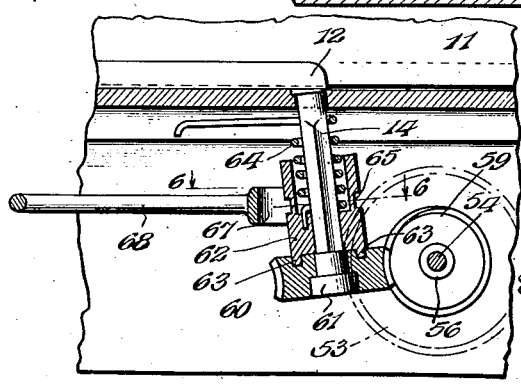
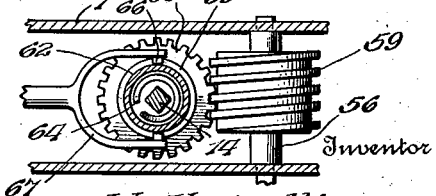
Inventor
W. H. Mullins.
By Lacey & Lacey
Attorneys

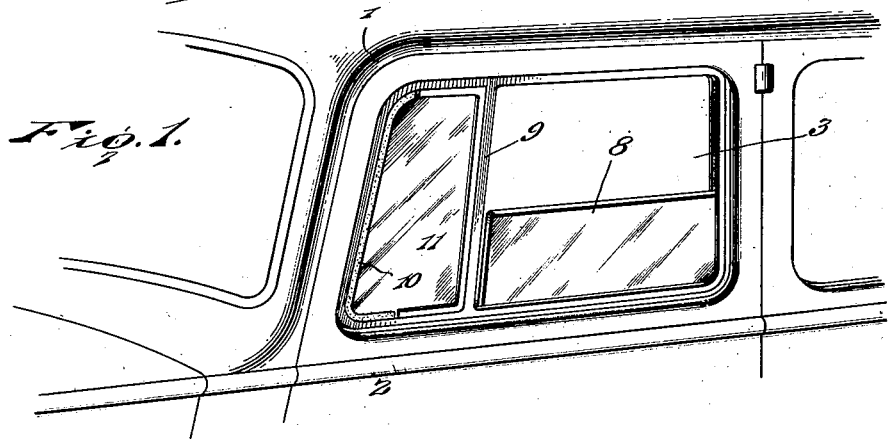
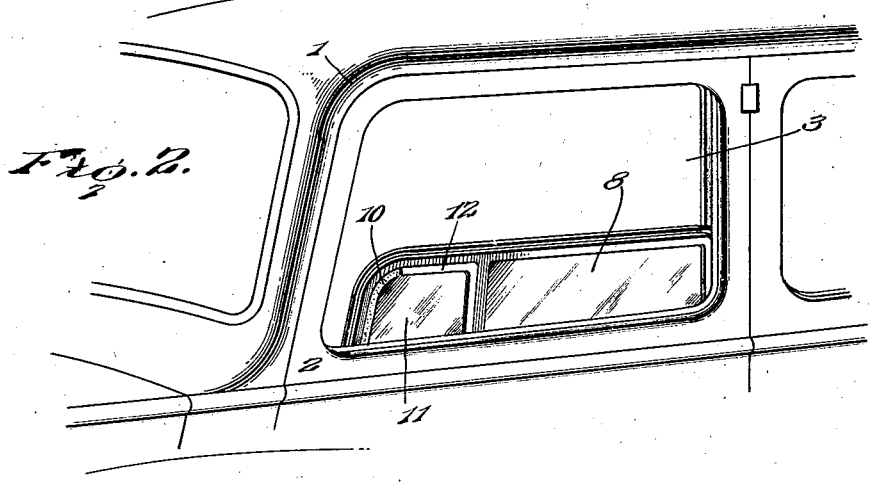
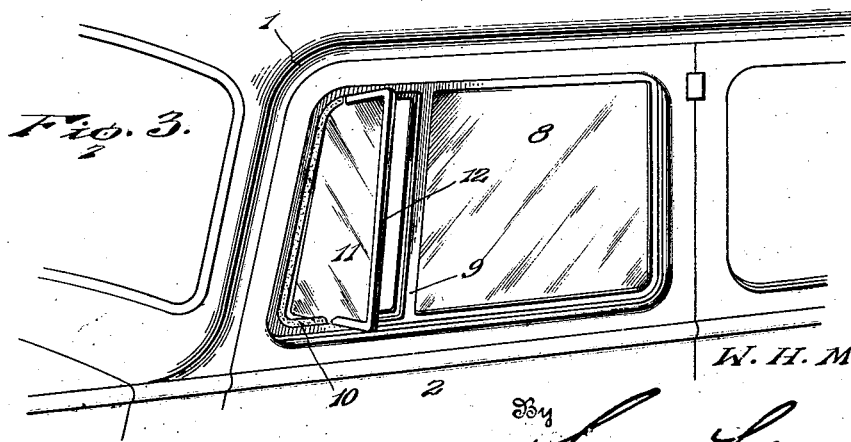

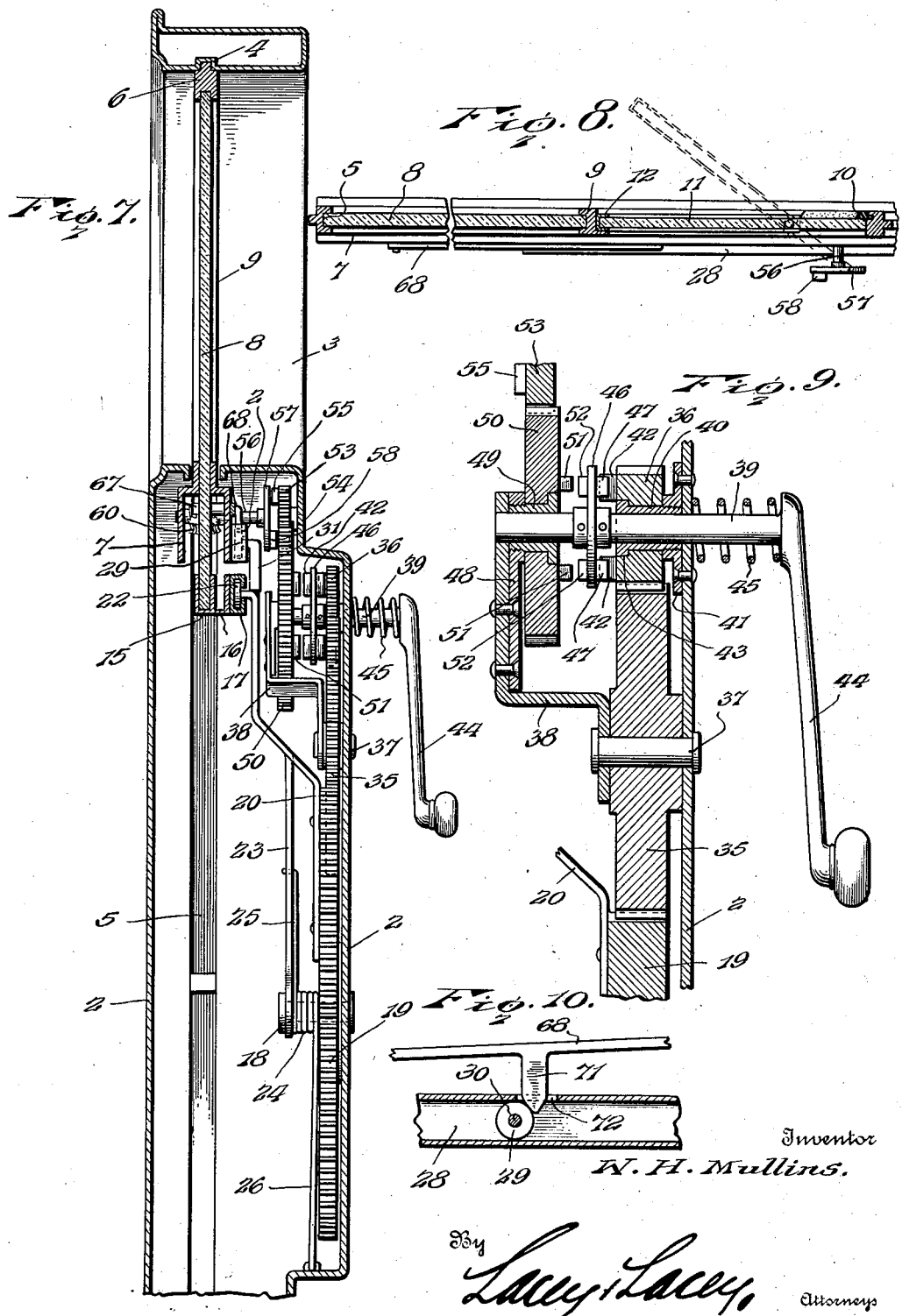

Patented Sept. 14, 1937

2,093,053

UNITED STATES PATENT OFFICE 2,093,053

VENTILATING WINDOW FOR VEHICLES

William H. Mullins, South Boston, Va.

Application March 21, 1934, Serial No. 716,702

7 Claims. (Cl. 296—44)

This invention relates to vehicle windows and has for its object the provision of a window of such construction and so mounted that the rear half of the window may be opened, or the front section of the window may be opened, or the entire window may be opened, as the occupant of the vehicle may desire, the opening of the entire window or of either the front or rear portion thereof being accomplished by manipulation of a single operating element. The invention seeks to provide a novel controlling mechanism whereby the window may be adjusted as desired and will be held in the set position. It is also an object of the invention to provide an arrangement in which the operating mechanism will be housed within the casing or hollow frame of the door or body of the vehicle, with the exception of the operating handle, so that accidental damage to the operating mechanism will not be apt to occur. Other objects of the invention will appear incidentally in the course of the following description, and the invention resides in certain novel features which will be particularly defined in the appended claims.

In the accompanying drawings which illustrate the invention:

Figure 1 is a perspective view of a portion of an automobile having my improved ventilating window therein with the rear panel of the window partly lowered.

Figure 2 is a similar view showing the entire window partly lowered.

Figure 3 is a similar view showing the front panel of the window turned so as to accomplish desired ventilation.

Figure 4 is an enlarged view, partly in section and partly in elevation, showing the entire window raised and disclosing the operating mechanism.

Figure 5 is a slightly enlarged detail section showing the pivotal mounting of the front panel of the window.

Figure 6 is an enlarged detail section on the line 6—6 of Figure 5.

Figure 7 is a transverse vertical section on the line 7—7 of Figure 4.

Figure 8 is a horizontal section on the line 8—8 of Figure 4.

Figure 9 is an enlarged section on the line 9—9 of Figure 4.

Figure 10 is a detail of a clutch shifting device.

Figure 11 is a view, partly in section and partly in elevation, of a cushion device.

The reference numeral 1 indicates a portion of an automobile body and 2 indicates the front door of the automobile, the door embodying a hollow casing or well below an open window space 3 in the upper end of the door. The hollow formation is also present in the body of the automobile and the present ventilating window may be mounted in the rear portion of the body or in the rear door, as well as in the front door. The walls of the window well or the door frame are constructed with beads 4 providing grooves 5 in which the window frame 6 is mounted to slide, the top of the window frame fitting in the groove in the top of the door frame so as to form a close fit therewith. The window frame includes, besides the top portion, a lower portion 7 which extends from front to rear of the door and is open at its lower side, as clearly shown in Figure 7, so that the glass pane or panel 8 may slide vertically independently of the frame when so desired. The window frame also includes a mullion strip 9 extending between the top and bottom of the frame, nearer the front end than the rear end thereof, and this mullion strip is provided with a groove in its rear side to receive the edge of the upper portion of the glass pane or panel 8. The front side or edge of this mullion strip is recessed or grooved on its outer face and the front side or end of the window frame is equipped with a strip 10 on its outer face and rear edge, as shown most clearly in Figure 8, to cushion the front edge of the front panel 11 of the window, when the latter is in closed position. As shown in Figure 8, the rear edge of the front panel 11 is fitted in a metal frame or guard strip 12 of U-shape cross section whereby it will constitute a channel protecting the edge of the panel, and it is also to be noted that the upper and lower ends of this channel strip are extended forwardly along the top and bottom edges of the panel, the end of the upper portion of the strip being equipped with a stud, indicated at 13, to engage a socket provided therefor in the window frame while the end of the lower extension of this strip is secured in any convenient manner to the upper end of a shaft 14 mounted in the window frame whereby the front panel will be pivotally mounted so that its rear portion may swing outwardly, as indicated by the dotted lines in Figure 8.

The glass pane or panel 8 has its lower edge disposed below the bottom of the window frame, as shown clearly in Figure 7, and to the lower edge of said panel is secured a guard frame 15 having an extension 16 at the inner side of the panel, a track 17 being secured to the inner side of said extension, as shown most clearly in Figure 7, for a purpose which will now appear. Below the window, a stub shaft or axle 18 is carried by the casing or frame 2 and upon this axle or stub shaft is mounted a gear wheel 19, a lever or crank arm 20 being secured to the gear and extending upwardly therefrom, as shown in Figures 4 and 7, the upper portion of the lever or crank arm being offset so that its extremity is disposed immediately adjacent the track 17. Said track 17 is provided with a horizontal slot 21 extending from end to end thereof and the extremity of the crank arm or lever 20 is turned to pass through and play in said slot and is equipped with a disk or collar 22 disposed within the track whereby when the crank or lever is swung to either side, the track and, consequently, the window panel 8 will be lowered. The disk or collar 22 is housed within the track, as clearly shown in Figure 7, so that the parts will be held against accidental separation and will be fully operative at all times. A second lever or crank arm 23 is loosely mounted at its lower end upon the stub shaft 18 and rises therefrom, as clearly shown in Figure 4, and is engaged with the lower edge of the window frame 7 to operate the same. A torsion spring 24 is coiled around the stub shaft or axle 18 and has one end extended upwardly and engaged with the lever 23, as shown at 25, while the opposite end of the spring 26 is carried downwardly and secured to the frame or casing 2, as shown. This spring acts constantly to hold the lever 23 to the lever or crank arm 20 and also holds the upper end of the lever 23 at the rear end of a horizontal slot 27 which extends from about the center of the lower portion of the window frame to the front end thereof. The slot 27 is formed in the side of a track 28 which is secured upon the inner side of the window frame 7, as shown in Figure 7, and a disk or collar 29 engages in the track in the same manner that the disk or collar 22 is housed in the track 17. The disk or collar 29 is carried by a pin or stud 30 on the upper end of a cap sleeve 31 which is slidably fitted on the upper end of the lever 23, as will be understood upon reference to Figure 11. As shown in Figure 11, the sleeve is held upon the lever by a pin 32 extended diametrically through the upper end portion of the lever and engaged in vertical slots 33 in the sides of the sleeve so that the sleeve may have some relative sliding movement of the lever but cannot be separated therefrom, and an expansion spring 34, within the sleeve between the extremity of the lever and the upper closed end of the sleeve, holds the sleeve in such position that there is always proper engagement between the collar 29 and the track 28. It will now be understood that if the gear 19 be rotated so that the crack arm or lever 20 will be swung toward the rear edge of the door the engagement of the collar 22 with the track 17 will cause the window pane or panel 8 to move downwardly and assume the relative position indicated in Figure 1, the front panel and the window frame being left in their normal or initial positions, as shown. If the gear 19 be turned in the opposite direction, the crank arm or lever 20 will be caused to impinge against the lever 23 and will thereby swing the latter lever forwardly, the two levers then cooperating so that the rear panel 8 and the front window frame will both be lowered, the front panel, of course, following the movement of the frame so that the entire window will be moved to an open position, as shown in Figure 2. To impart rotation to the gear wheel 19, a transmission gear 35 is mounted upon the door frame or casing 2 above the gear 19 and meshes therewith, while a smaller gear 36 is mounted upon the door frame or casing above the gear 35 and meshes with the same. The gear 35 is mounted loosely upon a stationary shaft or axle 37 which is mounted upon the door frame or casing, and upon the inner end of said axle is fitted a bracket 38 which extends inwardly and then upwardly therefrom to support the inner end of the operating shaft 39.

The shaft 39 is slidably fitted through and journaled in a sleeve or hub 40 upon which the gear 36 is rotatably mounted and a stop collar or spacer 41 is secured upon the door frame or casing between the same and the gear 36 so as to maintain the gear in proper relation to the adjacent parts. The gear 36 is provided on its inner side with lugs 42 and the hub 41 is constructed with an annular flange 43, at its inner end, cooperating with the bracket 41 so as to prevent endwise movement of the gear. The shaft 36 has a crank handle 44 secured to its outer end and an expansion spring 45 disposed about the shaft 39, between the end of the crank and the side of the door frame or casing 2, holds the shaft normally in its outer position. The inner end of the shaft is supported by the bracket 38 and, at the inner side of the gear 36, a clutch disk or collar 46 is secured upon the shaft, as clearly shown in Figure 9, said clutch disk being provided with lugs 47 on its outer face adapted to cooperate with the lugs 42 on the inner end of the gear 36 so that when the shaft is rotated, the gear 36 will be rotated and the motion transmitted through the gear 35 to the gear 19. A supporting plate 48 is secured to and carried by the bracket 38 and in the upper end of this plate 48 is mounted a hub or bushing 49 upon which a gear wheel 50 is rotatably mounted, the hub having an annular flange at its inner end cooperating with the plate 48 to prevent sliding movement of the gear lengthwise of the shaft 39. On its outer face, the gear 60 is provided with lugs 51 which are arranged to mate with lugs 52 on the inner face of the clutch disk 46, and it will now be understood that if the shaft 39 be rotated while in its outer position, the gear 36 will be rotated while, if the shaft be pushed inwardly, the lugs 52 will be brought into engagement with the lugs 51 so that the gear 50 will be rotated, the gear 36 then remaining idle. The gear 50 meshes with a pinion 53 secured upon a stub shaft 54 mounted in the door frame above the shaft 39 and bracket 38, said pinion being provided on its inner face with lugs 55. Alined with the shaft 54 is a shaft 56 having a clutch disk 57 secured upon its outer end, said disk being provided on its outer face with lugs 58 adapted to be engaged by the lugs 55 on the pinion 53. The shaft 56 is journaled in the window frame 7 and between the sides of said frame is equipped with a worm 59, as shown in Figure 6, it being observed that the shaft 56 and the pinion 53 are located near the front edge of the window frame and below the opening for the front panel. The worm 59 meshes with a worm pinion 60 which is rotatably mounted on the lower end of the pivot or shaft 14, said shaft, as shown clearly in Figure 5, being provided with a head 61 at its lower end fitting within a recess in the worm pinion, so as to support the pinion, as will be understood. The shaft or pivot 14 is of non-circular cross section, as will be understood upon reference to Figures 5 and 6, and slidably mounted upon the shaft is a clutch sleeve 62 having pins or studs 63 on its lower end adapted to engage in sockets provided therefor in the opposite side of the worm gear 60 so that when the worm pinion is rotated, the sleeve 62 will be rotated and, consequently, the pivot or shaft will be turned so as to adjust the panel 11 into either of the positions shown in Figure 8. Disposed within the clutch sleeve 62 is a spring 64 which is coiled about the shaft or pivot 14 and has its lower end secured in the sleeve while its upper end is extended somewhat and secured within the window frame. When the pinion is rotated to open the panel 11, the spring 64 will be wound, and if the clutch sleeve be released from the pinion 60, the spring will unwind and return the panel to the closed position. The sleeve is provided with an external annular groove 65 in which are engaged pins 66 on a fork 67 which is carried by the front end of a lever 68. Said lever 68 is pivoted at its rear end upon the side of the window frame, as shown at 69, and near its forward end is offset so as to pass through an opening 70 provided therefor in said window frame whereby the front end of the lever and the yoke 67 thereon are brought into proper relation to the clutch sleeve 62. On the underside of the lever 68 is a lug or tooth 71 which passes through an opening 72 in the top of the track 28 and projects into the path of the collar or disk 29 whereby it may be actuated by said disk. Normally, the lug or tooth 71 is in the path of the collar 29, as shown clearly in Figure 10, and, if the front window panel 11 is in the closed position, the actuation of the lever by the engagement of the collar 29 with the tooth will have no effect upon the operation. Should the front panel, however, be in the open position when it is attempted to lower the entire window, the forward movement of the lever 23 will cause the tooth 71 to ride upwardly and consequently swing the front end of the lever upwardly so that the clutch sleeve 62 will be lifted out of engagement with the worm pinion 60 whereby the spring 64 will at once swing the panel to closed position. If the panel should be already closed, the lifting of the clutch sleeve 62 will be merely an idle effort as, at that time, the spring 64 will be unwound.

From the foregoing description, taken in connection with the accompanying drawings, it will be seen that I have provided a very compact and efficient mechanism which may be mounted in any hollow door frame or vehicle body and actuated to raise or lower an entire window or to raise or lower the rear panel of said window alone, or to swing the front panel of the window pivotally into an open or closed position. The structure does not detract from the appearance of the vehicle or any of the parts of the same and any desired adjustment of the window to effect proper ventilation may be very easily and quickly accomplished by merely turning the crank handle 44.

Having thus described the invention, I claim:

1. In a vehicle ventilating mechanism, a window frame, a panel pivotally mounted in said frame, a second panel slidably mounted in said frame, a single operating element, and means whereby manipulation of said element may effect turning movement of the first-mentioned panel or sliding movement of the second-mentioned panel or sliding movement of the frame with both panels.

2. A vehicle ventilating mechanism comprising a window frame slidably mounted within a hollow casing of the vehicle, a window pane slidably fitted in said frame, tracks secured upon the frame and the pane respectively at the lower edges thereof, a gear mounted below the frame and pane, means for turning said gear in either direction, a crank secured to said gear and slidably engaged with the lower portion of the window pane, a lever loosely mounted concentric with the gear and slidably engaged with the window frame, and yieldable means holding said lever to the crank arm whereby rotation of the gear in one direction will lower the window frame and the window pane and rotation of the gear in the opposite direction will lower the window pane independently of the frame.

3. In a vehicle ventilating mechanism, a vertically slidable window frame, a track on the side of the frame having a horizontal slot in its outer side, a gear below the frame, means for rotating said gear, a lever loosely mounted on the axle of the gear and having its upper end slidably engaged with the track through the slot in the side of the same, yieldable means holding the lever at the rear end of the track, and means on the gear to impinge upon the lever and swing the same whereby to raise or lower the window frame.

4. A window ventilating mechanism comprising a window frame, a panel pivotally mounted in the frame, gearing mounted in the frame and arranged to rotate the pivot of the panel for turning the panel to open position, means tending constantly to hold the panel in closed position, and means for releasing the last-mentioned means from the gearing.

5. A window ventilating mechanism comprising a window frame, a panel pivotally mounted in the forward portion of said frame, means for turning the panel to open position including an operating shaft and a pinion driven by said shaft, said pinion being rotatably fitted upon the pivot of the window panel, a clutch operatively connecting the pinion with the pivot of the window panel, a spring connected with the clutch and wound by the opening movement of the window panel, and means for releasing the clutch from the pinion whereby the spring will unwind and close the window panel.

6. A window ventilating mechanism comprising a vertically slidable window frame, a panel pivotally mounted within the bottom portion of the frame, a clutch sleeve slidably engaged upon the lower pivot of the panel and constrained to rotate therewith, means for rotating said clutch sleeve to swing the panel to open position, means for lowering the window frame including a lever pivotally mounted at its lower end and slidably engaged at its upper end with said frame, a spring connected with the clutch sleeve to be wound by the opening movement of the window panel, a lever pivoted upon the window frame and engaged at its front end with the clutch sleeve and having a projection on its underside extending into the path of the first-mentioned lever whereby when the window frame is lowered the clutch sleeve will be released from the actuating mechanism and the spring will swing the panel to closed position.

7. In a window ventilating mechanism, a vertically slidable window frame, a window panel slidably mounted in the frame, a second panel pivotally mounted in the frame in advance of the first-mentioned panel, an operating shaft, a train of gearing, the operating shaft being slidably mounted through the axle of one member of said train of gearing, means whereby the actuation of the gearing will lower the window frame and the slidably mounted panel, gearing to be actuated by the shaft for turning the pivotally mounted panel to open position, yieldable means for holding the shaft normally in an outer position, a clutch disk on the shaft, interengaging lugs on said disk and the adjacent gear of the train of gearing whereby the shaft will normally actuate said gearing, gearing for turning the pivotally mounted panel including a gear loose upon the shaft, and interengaging lugs on said gear and the clutch disk whereby in an inner position the shaft will operate the pivoted panel.

WILLIAM H. MULLINS.